(12) United States Patent
Riemer

(10) Patent No.: US 9,272,297 B2
(45) Date of Patent: *Mar. 1, 2016

(54) ULTRASONIC ATOMIZING NOZZLE METHODS FOR THE FOOD INDUSTRY

(75) Inventor: Joseph Riemer, Rhinebeck, NY (US)

(73) Assignee: Sono-Tek Corporation, Milton, NY (US)

( * ) Notice: Subject to any disclaimer, the term of this patent is extended or adjusted under 35 U.S.C. 154(b) by 1633 days.

This patent is subject to a terminal disclaimer.

(21) Appl. No.: 12/041,912

(22) Filed: Mar. 4, 2008

(65) Prior Publication Data

US 2009/0224066 A1    Sep. 10, 2009

(51) Int. Cl.
| | | |
|---|---|---|
| *B05C 11/00* | (2006.01) | |
| *B05B 7/08* | (2006.01) | |
| *A21C 15/00* | (2006.01) | |
| *A23L 1/00* | (2006.01) | |
| *A23P 1/08* | (2006.01) | |
| *B06B 1/00* | (2006.01) | |
| *B05B 7/04* | (2006.01) | |
| *B05C 5/02* | (2006.01) | |
| *B05B 15/04* | (2006.01) | |
| *B05B 17/06* | (2006.01) | |
| *B05B 7/00* | (2006.01) | |

(52) U.S. Cl.
CPC .............. *B05B 7/0815* (2013.01); *A21C 15/002* (2013.01); *A23L 1/0047* (2013.01); *A23P 1/081* (2013.01); *B05B 17/063* (2013.01); *B05B 17/0623* (2013.01); *B05B 7/0075* (2013.01); *B05B 15/0431* (2013.01); *B05B 17/0607* (2013.01); *B05C 5/0225* (2013.01)

(58) Field of Classification Search
CPC .......... B05B 1/02; B05B 1/262; B05B 1/265; B05B 1/267; B05B 1/26; B05B 3/063; B05B 3/1092; B05B 5/0426; B05B 7/0815; B05B 7/0075; B05B 15/066; B05B 15/069; B05B 17/0623; B05B 17/0646
USPC ....... 118/24; 239/102.1, 102.2, 600, DIG. 19; 427/424; 347/68
See application file for complete search history.

(56) References Cited

U.S. PATENT DOCUMENTS

| | | | | |
|---|---|---|---|---|
| 2,532,224 A | * | 11/1950 | Collins | ................... B02C 19/06 261/117 |
| 3,765,606 A | | 10/1973 | Moss et al. | |
| 3,972,277 A | * | 8/1976 | Tamano | ................ A47J 39/003 426/241 |
| 4,004,736 A | | 1/1977 | George | |

(Continued)

FOREIGN PATENT DOCUMENTS

JP           05-200328 A     8/1993

OTHER PUBLICATIONS

Harvey L. Berger, Ph.D., "Ultrasonic Liquid Atomization—Theory and Application"; entire book; Partridge Hill Publishers, Hyde Park, New York; 1998.

*Primary Examiner* — Karl Kurple
(74) *Attorney, Agent, or Firm* — Miles & Stockbridge PC

(57) ABSTRACT

A spraying mechanism configured to form uniform and thin coatings on foodstuffs and food packaging materials. The spraying mechanism includes a nozzle and a surface positioned adjacent to the nozzle, wherein the surface is configured to support at least one of a foodstuff and a food packaging material. The nozzle includes an atomizing section including a ceramic material and an intermediate section configured to promote ultrasonic-frequency mechanical motion in the atomizing section.

11 Claims, 6 Drawing Sheets

(56) References Cited

U.S. PATENT DOCUMENTS

| | | | |
|---|---|---|---|
| 4,073,436 A * | 2/1978 | Behr | 239/8 |
| 4,082,223 A * | 4/1978 | Nozawa | 239/333 |
| 4,284,239 A | 8/1981 | Ikeuchi | |
| 4,296,068 A * | 10/1981 | Hoshino | 422/62 |
| 4,337,896 A * | 7/1982 | Berger et al. | 239/102.2 |
| 4,415,123 A | 11/1983 | Ikeuchi | |
| 4,521,462 A * | 6/1985 | Smythe | B05B 5/0407 118/300 |
| 4,605,167 A * | 8/1986 | Maehara | B05B 17/0646 239/102.2 |
| 4,610,760 A * | 9/1986 | Kirkpatrick et al. | 159/4.01 |
| 4,659,014 A * | 4/1987 | Soth et al. | 239/102.2 |
| 4,857,367 A * | 8/1989 | Thorn | B05B 7/0807 118/323 |
| 4,978,067 A * | 12/1990 | Berger et al. | 239/102.2 |
| 5,078,322 A * | 1/1992 | Torntore | 239/289 |
| 5,219,120 A * | 6/1993 | Ehrenberg et al. | 239/11 |
| 5,330,100 A | 7/1994 | Malinowski | |
| 5,409,163 A * | 4/1995 | Erickson et al. | 239/4 |
| 5,516,043 A * | 5/1996 | Manna et al. | 239/102.2 |
| 5,540,384 A * | 7/1996 | Erickson | B05B 17/0623 239/102.2 |
| 5,582,348 A * | 12/1996 | Erickson et al. | 239/4 |
| 5,687,905 A * | 11/1997 | Tsai | 239/4 |
| 6,102,298 A * | 8/2000 | Bush et al. | 239/4 |
| 6,158,676 A * | 12/2000 | Hughes | 239/405 |
| 6,190,727 B1 * | 2/2001 | Thaggard | 427/9 |
| 6,338,472 B1 * | 1/2002 | Shimazu et al. | 261/78.2 |
| 6,401,651 B1 * | 6/2002 | Mochizuki | A23G 3/2092 118/24 |
| 6,585,175 B2 | 7/2003 | Takeuchi et al. | |
| 6,719,211 B2 | 4/2004 | Takeuchi et al. | |
| 6,752,326 B2 | 6/2004 | Hirota et al. | |
| 6,880,770 B2 | 4/2005 | Jameson et al. | |
| 6,933,019 B2 * | 8/2005 | Mayer et al. | 427/421.1 |
| 7,341,763 B2 * | 3/2008 | Miyamoto | C23C 4/125 219/76.14 |
| 7,364,775 B2 * | 4/2008 | Klein | 427/427.2 |
| 7,638,114 B1 * | 12/2009 | Schur | 424/45 |
| 7,712,680 B2 * | 5/2010 | Berger et al. | 239/102.2 |
| 2001/0026850 A1 * | 10/2001 | Shah et al. | 427/600 |
| 2004/0247776 A1 | 12/2004 | Folestad et al. | |
| 2005/0098101 A1 * | 5/2005 | Shen et al. | 118/696 |
| 2005/0100667 A1 * | 5/2005 | Mayer et al. | 427/248.1 |
| 2005/0100690 A1 * | 5/2005 | Mayer et al. | 428/34 |
| 2006/0169202 A1 * | 8/2006 | Erickson | B05B 7/02 118/323 |
| 2006/0260451 A1 * | 11/2006 | Capodieci | B26D 1/00 83/34 |
| 2008/0265052 A1 * | 10/2008 | Quan et al. | 239/4 |
| 2008/0314314 A1 * | 12/2008 | Erickson | B05B 7/02 118/302 |
| 2010/0078496 A1 * | 4/2010 | Massimi | 239/4 |
| 2011/0107966 A1 * | 5/2011 | Yamada | 118/694 |
| 2011/0159197 A1 * | 6/2011 | Kurata et al. | 427/421.1 |
| 2014/0011318 A1 * | 1/2014 | Massimi | B05B 17/06 438/98 |

\* cited by examiner

ULTRASONIC ATOMIZING NOZZLE METHODS FOR THE FOOD INDUSTRY

CROSS-REFERENCE TO RELATED APPLICATIONS

This application is related to U.S. patent application Ser. No. 11/341,616, titled "Ultrasonic atomizing nozzle and method," filed Jan. 30, 2006, the disclosures of each which are hereby incorporated by reference in their entirety.

FIELD OF THE INVENTION

The present invention relates generally to methods of forming coatings for the food industry. More particularly, the present invention relates to methods of using ultrasonic nozzles in the food industry.

BACKGROUND OF THE INVENTION

Currently, foodstuffs and food packaging materials are routinely coated with various liquid-state chemicals or ingredients. Depending on the particular application, these chemicals may either remain in the liquid state, evaporate, or polymerize/solidify to form a solid coating. For example, while being manufactured (i.e., prior to being wrapped in a waxy paper sleeve and prior to being inserted into a cardboard package that is then placed on the shelves of a grocery store), some crackers are coated with a thin layer of oil. Similarly, commercially manufactured tortilla chips are typically sprayed with one or more chemical preservatives to extend their shelf life.

Two types of technologies are currently available to apply such liquid-state coatings: pressure spraying and spinning disc spraying. Pressure spraying technology is analogous to the technology used while spraying one's lawn with a garden hose. In other words, foodstuffs or food packaging materials are coated by a liquid emitted from one or more pressurized nozzles. Typically, such nozzles are located at least above and below the foodstuffs or food packaging materials being coated.

Spinning disc spraying involves a battery (i.e., a series) of spinning discs located in a chamber. These discs are angled and positioned in an application-specific configuration relative to the foodstuffs or food packaging materials to be coated. A stream of liquid is then released onto the discs as the discs are spinning. As the liquid is expelled from the surface of the discs by centrifugal force, a rainforest-type of liquid mist is generated all over the chamber in which the discs are located. The foodstuffs or food packaging materials that pass through the chamber are then coated on all sides by the liquid.

Regardless of which of these methods is used, however, the coatings formed are relatively thick. Also, particularly in the spinning disc method, a significant amount of liquid is wasted as the liquid coats the walls of the chamber instead of the foodstuffs or food packaging materials.

SUMMARY OF THE INVENTION

At least in view of the above, it would be desirable to provide methods for forming coatings on foodstuffs and/or food packaging materials wherein the resulting coatings are relatively thin. In addition, it would be desirable to provide methods for forming coatings on foodstuffs and/or food packaging materials wherein the coating are uniform and wherein the amount of liquid being used is minimized.

The foregoing needs are met, to a great extent, by certain embodiments of the present invention. According to one embodiment, a spraying mechanism is provided. The spraying mechanism includes a nozzle that itself includes an atomizing section including a ceramic material. The nozzle also includes an intermediate section configured to promote ultrasonic-frequency mechanical motion in the atomizing section. The spraying mechanism also includes a surface positioned adjacent to the nozzle and configured to support at least one of a foodstuff and a food packaging material.

According to another embodiment of the present invention, a method of depositing a coating on at least one of a foodstuff and a food packaging material is provided. The method includes coating a portion of a ceramic surface with a liquid. The method also includes mechanically moving the surface at an ultrasonic frequency. In addition, the method also includes positioning at least one of the foodstuff and the food packaging material adjacent to the surface.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
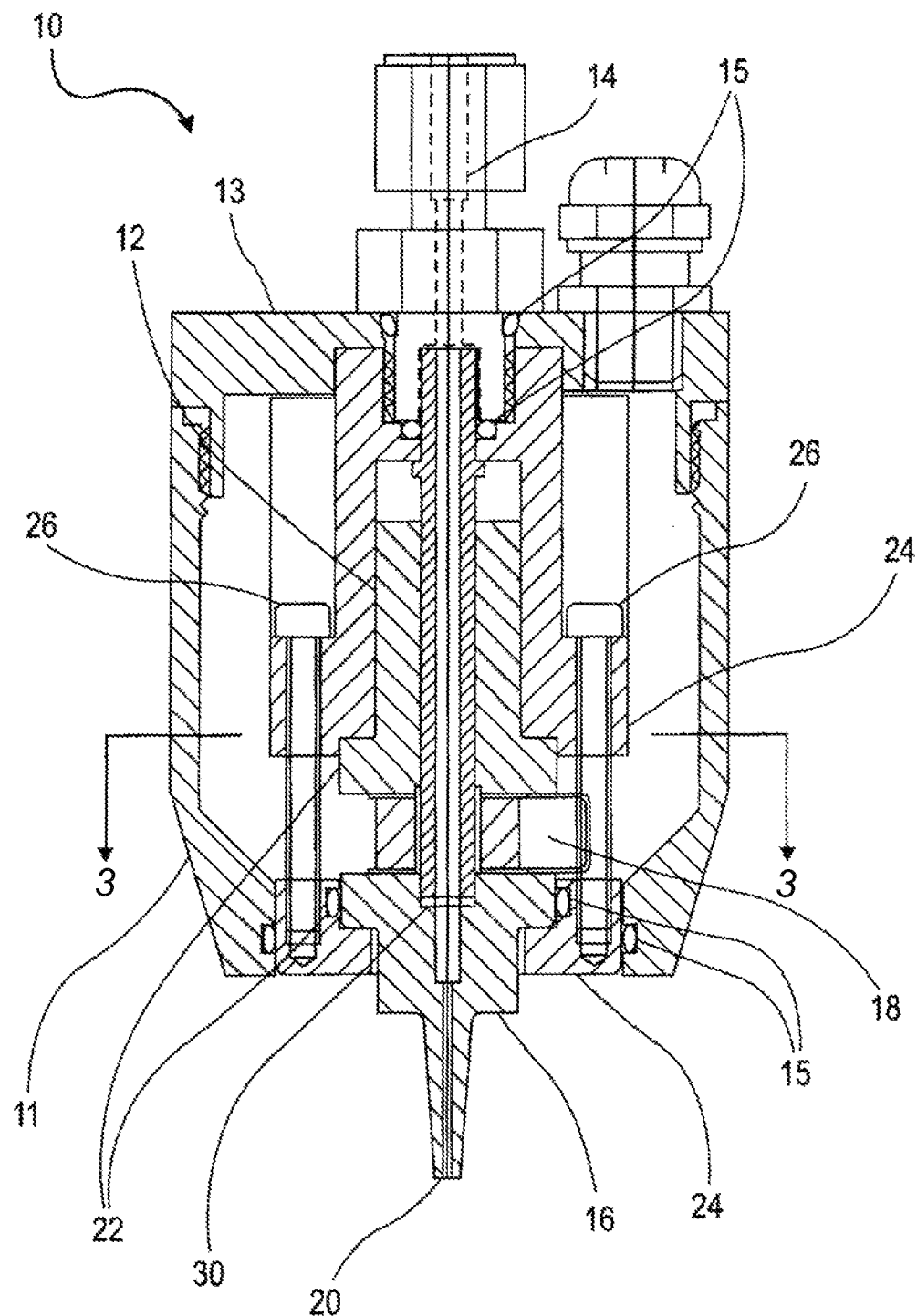
FIG. 1 is a longitudinal cross-sectional view of a ceramic-containing ultrasonic atomizing nozzle arrangement according to a first embodiment of the present invention.
Figure 2:
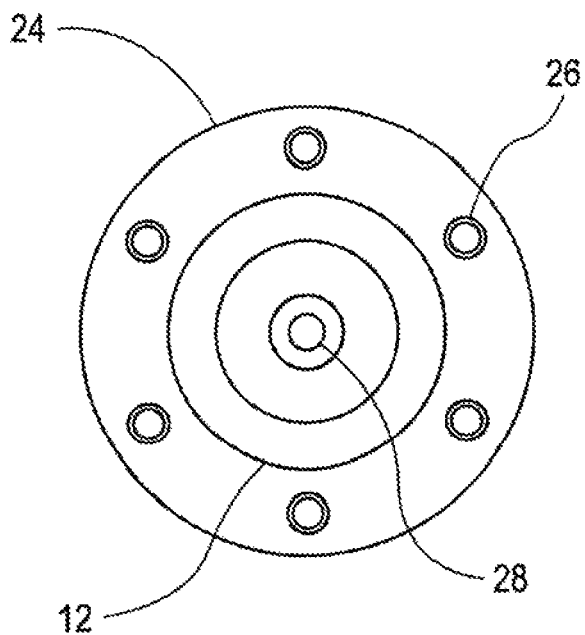
FIG. 2 illustrates a radial cross-section of the ultrasonic atomizing nozzle arrangement illustrated in FIG. 1 taken along line 3-3.
Figure 3:
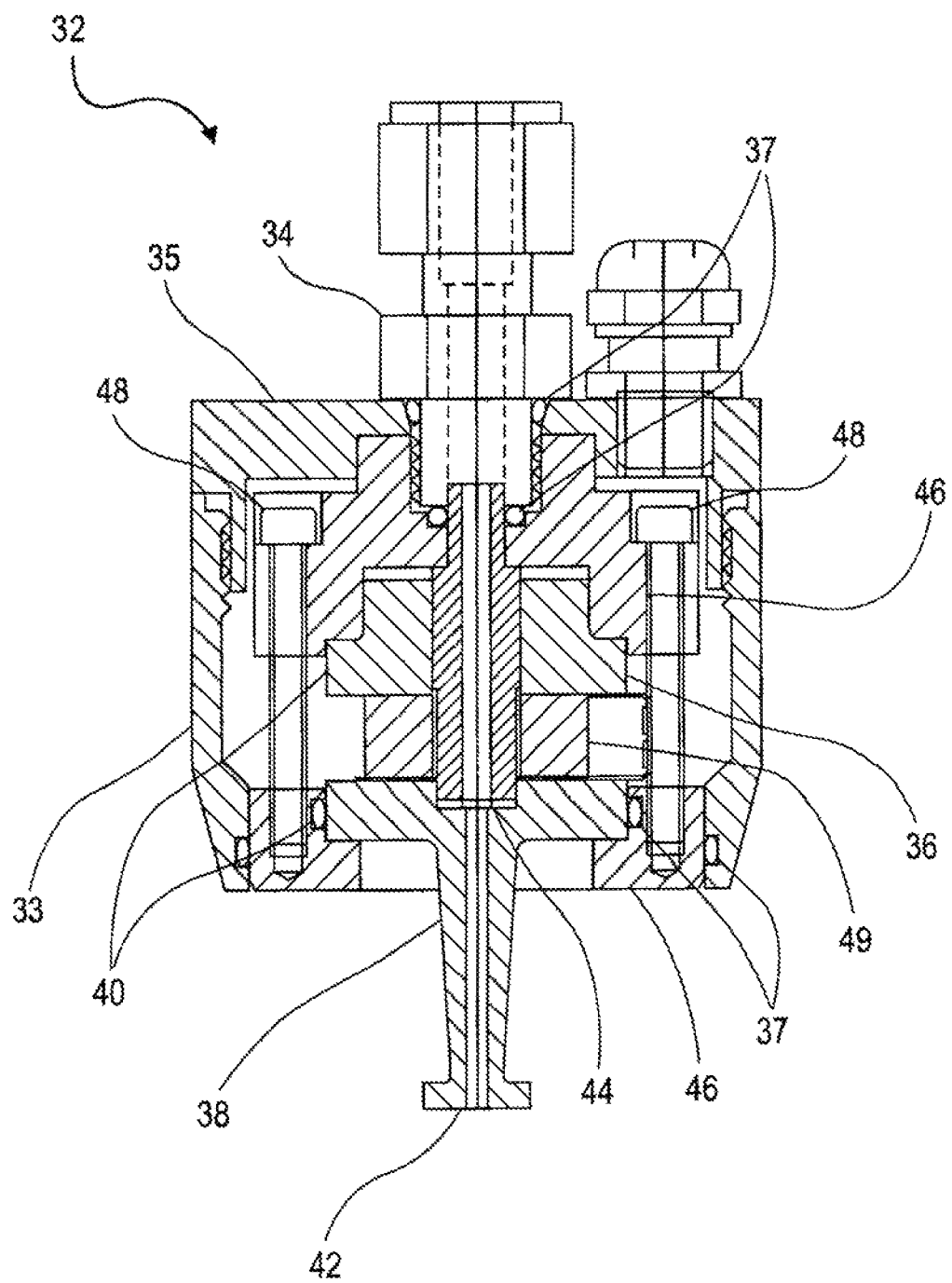
FIG. 3 is a longitudinal cross-sectional view of a ceramic-containing ultrasonic atomizing nozzle arrangement according to a second embodiment of the present invention.
Figure 4:
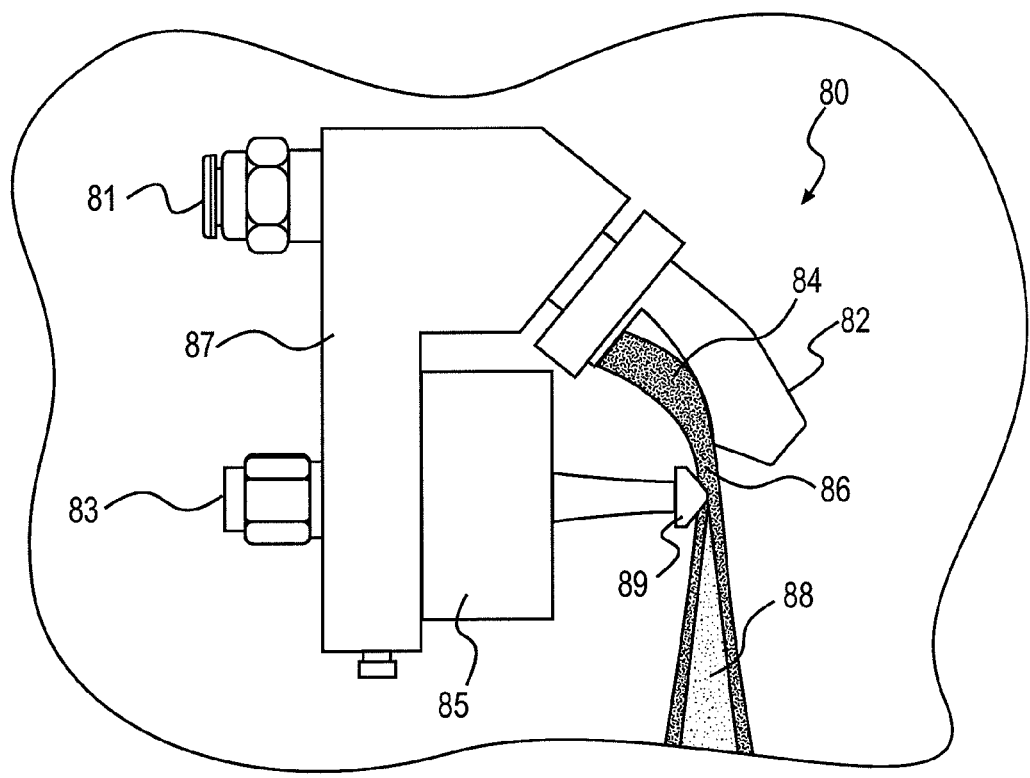
FIG. 4 is a side view of an ultrasonic nozzle spray arrangement according to a third embodiment of the present invention.

The invention will now be described with reference to the drawing figures, in which like reference numerals refer to like parts throughout. FIG. 1 is a longitudinal cross-sectional view of a ceramic-containing ultrasonic atomizing nozzle arrangement 10 according to a first embodiment of the present invention. However, before further discussing the drawing figures any further, a few scientific principles related to ultrasonic atomization are briefly reviewed below.

Ceramic materials (e.g., SiC and $Al_2O_3$) differ from metals (e.g., titanium and titanium alloys) in a number of ways. For example, in some ceramic materials, such as silicon carbide (SiC) and aluminum oxide ($Al_2O_3$), the characteristic velocity at which sound waves propagate through these materials is considerably greater than the characteristic velocity at which sound waves propagate through any metallic material that is practical for use in constructing an ultrasonic atomizing nozzle. For example, SiC can be manufactured such that the characteristic velocity of sound therein is between 2.3 and 2.7 greater than the characteristic velocity of sound in a Ti-6Al-4V titanium alloy.

When implementing an ultrasonic atomization method according to certain embodiments of the present invention, capillary waves are produced in a liquid coating that is present on a solid surface that is vibrating at an ultrasonic frequency. Under such conditions, the number median drop size ($d_{N,0.5}$) of the drops formed is calculated as follows:

$$d_{N,0.5}=0.34(8\pi s/\rho f^2)^{1/3},$$

where f=the operating frequency of the nozzle, ρ=the density of the liquid coating the surface and s=the surface tension of the liquid. Hence, as the operating frequency, f, increases, the number median drop size ($d_{N,0.5}$) decreases.

In order to form capillary waves that are suitable for ultrasonic atomization, it is desirable to suppress the formation of waves that are not perpendicular to the solid surface from which the liquid film absorbs vibrational energy. In order to suppress the formation of such non-perpendicular waves, the largest diameter of any active nozzle element is limited. More specifically, the diameter is limited to a length that is below one-fourth of the wavelength, λ, of an acoustic wave in the material from which the atomizing surface is formed.

The wavelength, λ, of an acoustic wave in such a material is calculated as follows:

$$\lambda=c/f,$$

where c=the characteristic velocity at which sound waves propagate through a ceramic material. Thus, for a given operational frequency, materials having higher characteristic velocities, c, at which sound waves propagate therethrough correspond to longer wavelengths. Hence, such materials allow for a larger nozzle diameter at a given frequency.

When the diameter of the nozzle becomes so small that the nozzle becomes impractical to make or use, the practical operating frequency of the nozzle is reached. As such, in metallic nozzles according to the prior art (i.e., in nozzles where the vibrating surface is metallic), the practical upper limit of the operating frequency, f, is approximately 120 kHz. However, in nozzles according to embodiments of the present invention where ceramics are used, the upper limit of the operating frequency, f, is raised to approximately 250 kHz. Thus, for a given liquid, $d_{N,0.5}$ is reduced by a factor of $(120/250)^{2/3}=0.61$.

Keeping in mind the above-mentioned characteristics of ceramic materials, one of skill in the art will appreciate that, at a given operating frequency, f, ceramic nozzles can be operated at a greater flow rate than their metallic counterparts. In other words, the diameter of the nozzle can remain larger in a ceramic nozzle than in a metallic nozzle, as can stems, the area of the atomizing surface, and/or liquid feed orifices that may be included to lead liquid to the nozzle.

As mentioned above, FIG. 1 is a longitudinal cross-sectional view of an ultrasonic atomizing nozzle arrangement 10 according to a first embodiment of the present invention. The nozzle 10 illustrated in FIG. 1 includes a rear horn 12 that functions as an interface section. As such, the rear horn 12 is configured to allow the introduction of a liquid into the nozzle 10.

The rear horn 12 illustrated in FIG. 1 is directly connected to a liquid inlet 14. However, the rear horn 12 may be directly or indirectly connected to any component that will allow for flow of a liquid into the nozzle 10. The liquid inlet 14 may be affixed to the rear horn 12 in any manner that would become apparent to one of skill in the art upon practicing the present invention (e.g., a pressure seal or an adhesive). Although not illustrated in FIG. 1, the liquid inlet 14 is typically connected, either directly or indirectly, to a source of liquid such as, for example, a tank containing water based or oil based or solvent based food coating ingredients, in a solution or in a suspension mode.

According to certain embodiments of the present invention, the rear horn 12 is either made entirely from a ceramic material or portions of the rear horn 12 are made from a ceramic material. However, according to other embodiments of the present invention, the rear horn 12 is fabricated either partially or entirely from a metal. For example, the rear horn 12 may be made from silicon carbide (SiC) or aluminum oxide ($Al_2O_3$).

The nozzle 10 illustrated in FIG. 1 also includes a front horn 16 that is configured to function as an atomizing section. The front horn 16, according to certain embodiments of the present invention, can include one or more portions made from a ceramic material (e.g., SiC or $Al_2O_3$) or can be made entirely from one or more ceramic materials. The front horn 16 is configured to form drops of the liquid introduced into the nozzle 10 through the rear horn 12. These drops can, according to certain embodiments of the present invention, have number median drop sizes ($d_{N,0.5}$) of less than approximately 20 microns (e.g., approximately 17 microns), although larger drop sizes are also within the scope of certain embodiments of the present invention. Also, according other embodiments of the present invention, the front horn 16 is configured to form drops of liquid having number median drop sizes of between approximately 7 microns and approximately 10 microns.

One of the advantages of the nozzle 10 illustrated in FIG. 1 is that it increases the rate at which a liquid introduced into the nozzle 10 may be atomized. As discussed above, because the ceramic material used in embodiments of the present invention have higher characteristic velocities at which sound waves propagate therethrough, a larger front nozzle diameter is allowable for a given frequency. Therefore, according to certain embodiments of the present invention, the front horn 16 is configured to allow the liquid introduced into the nozzle 10 to flow through the nozzle 10 at a rate above approximately 600 ml per minute (10 gallons per hour). According to other embodiments of the present invention, the front horn 16 is configured to allow the liquid to flow through the nozzle 10 and the front horn 16 at a rate of approximately 1200 ml per minute (20 gallons per hour).

In the nozzle 10 illustrated in FIG. 1, the rear horn 12 and the front horn 16 have substantially equal lengths. However, according to other embodiments of the present invention, the rear horn 12 and the front horn 16 have different lengths. According to certain embodiments of the present invention, a ceramic nozzle operates at 250 kHz and the rear horn 12 and front horn 16 both have lengths equal to, for example, $3\lambda/4$, since horns of such length are substantially easier to manufacture than horns having lengths of $\lambda/4$. According to certain other embodiments of the present invention, a ceramic nozzle operates at 120 kHz and both horns 12, 16 have lengths of $\lambda/4$, which are relatively practical to manufacture.

The nozzle 10 illustrated in FIG. 1 also includes a transducer portion 18 that includes a pair of transducers that are positioned in an intermediate section of the nozzle 10 that is located between the rear horn 12 and the front horn 16. The transducers in the transducer portion 18 are piezoelectric transducers and are configured to promote ultrasonic-frequency mechanical motion in the front horn 16. In other words, the transducers in the transducer portion 18 provide the mechanical energy to cause the atomizing surface 20 located on the front horn 16 illustrated in FIG. 1 to vibrate at an ultrasonic frequency with sufficient amplitude to result in atomization. Although two transducers are discussed above as being included in the transducer portion 18 illustrated in FIG. 1, a single transducer and/or any other component or system that can be used to cause ultrasonic-frequency mechanical motion in the front horn 16 is also within the scope of the present invention.

The rear horn 12 and the front horn 16 each include a flange 22. A cover, in the form of a ring 24, is positioned adjacent to each of the flanges 22 illustrated in FIG. 1. A plurality of fasteners, in the form of bolts 26, are also illustrated in FIG. 1 and connect the two rings 24.

The above-discussed bolts 26 and rings 24 are components of a clamping mechanism that is positioned adjacent to the exterior surfaces of the rear horn 12 and front horn 16, respectively. This clamp is configured to keep the front horn 16 and the rear horn 12 adjacent to the transducer portion 18. In addition, this clamp is also configured to apply predetermined compressive forces to the transducer/horn assembly, thereby assuring proper mechanical coupling amongst the various elements of the assembly.

By using the clamp arrangement illustrated in FIG. 1, the rear horn 12 and the front horn 16, one or both of which may be made from a ceramic material, do not need to include threaded holes that directly accommodate the bolts to be kept adjacent to each other. This reduces the likelihood that either the rear horn 12 or the front horn 16 will crack as threaded holes are formed therein or that the ceramic threads formed in such holes will lack the shear strength to sustain the amounts of pressure to which they may be subjected (e.g., over 10,000 psi).

Also illustrated in FIG. 1 are a front shroud 11, a rear shroud 13 and a plurality of O-rings 15. Together, the front shroud 11 and the rear shroud 13 provide a housing for the nozzle 10 and the O-rings 15 provide a plurality of seals within this housing.

FIG. 2 illustrates a radial cross-section of the ultrasonic atomizing nozzle arrangement 10 illustrated in FIG. 1 taken along line 3-3. As illustrated in FIG. 2, the rear horn 12 has a fluid inlet 28 at the center thereof. This fluid inlet 28 is part of the liquid conduit 30 illustrated in FIG. 1 that allows liquid to travel from the liquid inlet 14 all the way to the atomizing surface 20 on the front horn 16.

As also illustrated in FIG. 2, the ring 24 extends around the rear horn 12 and has a plurality of bolts 26 positioned at various locations about the circumference thereof. Although a ring 24 is illustrated in FIG. 2 as making up a portion of the above-discussed clamp, other components may be positioned adjacent to the flanges 22 illustrated in FIG. 1. For example, square or rectangular plates may be used. Also, although six regularly spaced bolts 26 are illustrated around the periphery of the ring 24 in FIG. 2, other distributions of one or more bolts 26 or other fasteners may be used according to other embodiments of the present invention.

FIG. 3 is a longitudinal cross-sectional view of an ultrasonic atomizing nozzle arrangement 32 according to a second embodiment of the present invention. Like the nozzle 10 illustrated in FIG. 1, the nozzle 32 illustrated in FIG. 3 includes a liquid inlet 34, a rear horn 36 and a front horn 38, each having a flange 40. The front horn 38 also includes an atomizing surface 42 that is positioned at one end of a liquid conduit 44. In addition, the nozzle 32 illustrated in FIG. 3 includes a clamp arrangement that includes a plurality of rings 46 and bolts 48. Further, the nozzle 32 also includes a transducer portion 49 that includes a pair of transducers that are positioned in an intermediate section of the nozzle 32 that is located between the rear horn 36 and the front horn 38. Also illustrated in FIG. 3 are a front shroud 33 and a rear shroud 35 that, together, provide a housing for the nozzle 32 and a plurality of O-rings 37 that provide a plurality of seals within this housing.

One way in which the nozzle 32 illustrated in FIG. 3 differs from the nozzle 10 illustrated in FIG. 1 is that the front horn 38 illustrated in FIG. 3 is approximately 3 times a long as the rear horn 36 illustrated therein. This is particularly representative of the fact that the rear horn 12 and front horn 16 may, according to certain embodiments of the present invention, have different lengths. In fact, according to certain other embodiments of the present invention, the respective lengths of the rear horn and front horn in a given nozzle are multiples or fractions of each other. As mentioned above, under certain operating conditions (e.g., high frequencies), it becomes impractical to manufacture horns having lengths equal to λ/4. Therefore, horns having lengths equal to multiples of λ/4 are often used under such circumstances.

FIG. 4 and FIG. 5 illustrate a controllable ultrasonic sprayer 80 according to a third embodiment of the present invention. A flat jet air deflector horn 82 is positioned adjacent to an atomizing surface 89 of an ultrasonic nozzle 85. The flat jet air deflector horn 82 and atomizing surface 89 are each located on a jet block assembly 87. The ultrasonic nozzle 85 may be made from titanium and 316 stainless steel making it non-reactive with most liquids, although other types of materials may also be used. An air inlet fitting 81 and a liquid inlet fitting 83 are also situated on jet block assembly 87.

In operation, a controllable source of air is attached to air inlet fitting 81 and liquid to be atomized is connected to the liquid inlet fitting 83. A controllable air stream 84 from the air inlet fitting 81 is sent towards the flat jet air deflector horn 82, which reshapes the controllable air stream 84 into a flattened air pattern 86. The flattened air is deflected toward the atomizing surface 89 of the ultrasonic nozzle 85. Liquid that entered the sprayer 80 through the liquid inlet fitting 83 is atomized by the ultrasonic nozzle 85 and output at the atomizing surface 89. The atomized liquid is entrained in the flattened air pattern 86 producing a fan pattern 88 that is composed of air and the atomized liquid.

The area of the fan pattern 88 as well as the velocity and impact force of the atomized liquid particulate is related to the velocity of the controllable air stream 84. The ultrasonic nozzle 85 may operate in, for example, a frequency range of 25-120 kHz allowing for a variety of drop sizes with a flow rate from 1 ml/minute to 99 ml/minute.

Figure 6:
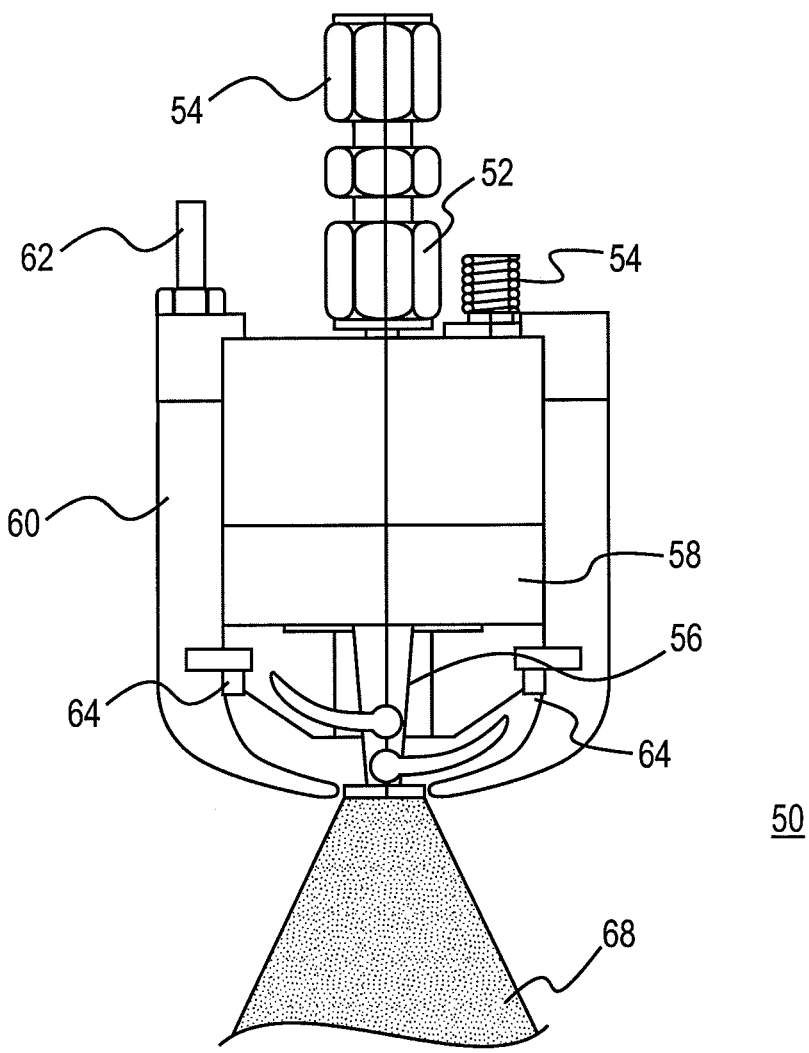
FIG. 6 is a side view of an ultrasonic vortex nozzle arrangement according to a fourth embodiment of the present invention.

FIG. 6 is a side view of an ultrasonic vortex nozzle arrangement 50 according to a fourth embodiment of the present invention. The arrangement 50 includes a liquid inlet fitting 52 through which liquid enters the nozzle. Also included is an input connector 54 from a broadband ultrasonic generator (not illustrated). The input connector 54 conveys ultrasonic vibrations from the generator into components of the arrangement 50 (i.e., the connector 54 causes certain components of the arrangement 50 to vibrate back and forth at an ultrasonic frequency).

Also included in the arrangement 50 are a nozzle stem 56 through which liquid in the arrangement 50 is sprayed and a nozzle body 58 that supports the stem 56. The nozzle stem 56 and body 58 are included within a nozzle housing 60 to which is also connected the liquid inlet fitting 52 and the input connector 54.

A compressed air inlet 62 is also connected to the housing 60. This inlet 62 is used to introduce compressed air into the arrangement 50 and the compressed air is output from the arrangement 50 through two compressed air outlets 64 located adjacent to the nozzle stem 56. In operation, low velocity rotational air is expelled from the air outlets 64 to produce a wide and stable spray pattern of liquid from the nozzle stem 56.

According to certain embodiments of the present invention, the arrangement 50 produces a conical spray pattern 68 that is between approximately 2" and approximately 6" in diameter, depending upon the frequency used and the distance between the nozzle stem 56 and the surface/item being sprayed/coated. For example, a 25 kHz frequency will produce a mean water drop size of 70 microns and the frequencies of 35 kHz, 48 kHz, 60 kHz and 120 kHz will produce 49 micron, 38 micron, 41 micron and 18 mean micron size water drops, respectfully.

As will be appreciated by those of skill in the art upon practicing one or more embodiments of the present invention, liquids other than water may have different drop sizes at the same frequencies, depending at least upon the viscosity of the alternate liquids.

According to yet another embodiment of the present invention, a method of atomizing a liquid is provided. The method includes coating a portion of a ceramic surface (e.g., the atomizing surface 20 illustrated in FIG. 1) with a liquid. According to certain embodiments of the present invention, this coating step includes introducing the liquid onto the surface at a rate of between approximately 600 ml/minute (i.e., 10 gal/hour) and approximately 1200 ml/minute (i.e., 20 gal/hour).

The method also includes mechanically moving (i.e., vibrating) the surface at an ultrasonic frequency. According to certain embodiments of the present invention, this mechanically moving step includes mechanically moving the surface at a frequency of between approximately 120 kHz and approximately 250 kHz. According to other embodiments of the present invention, the mechanically moving step includes mechanically moving the surface at a frequency of between approximately 25 kHz and less than approximately 120 kHz (e.g., approximately 60 kHz).

The above-discussed method also includes forming drops of the liquid having number median drop sizes of less than approximately 20 microns. According to certain embodiments of the present invention, the coating step comprises selecting liquids containing an organic solvent. According to these embodiments, the number median drop size of the drops formed during the above-discussed forming step is between approximately 7 microns and approximately 10 microns.

The above-discussed method also includes passing the liquid through an interface section that includes a ceramic material before performing the coating step. This passing step may be performed, for example, by passing liquid through either the rear horn 12 or the front horn 16 illustrated in FIG. 1, so long as at least one of these horn 12, 16 has a ceramic material incorporated therein.

According to other embodiments of the present invention, the above-discussed method includes clamping the interface section to an atomizing section that includes the ceramic surface. This clamping step is typically an alternative to having to use fasteners that would have to be screwed directly into components of a nozzle used to implement the above-discussed method.

According to certain embodiments of the present invention, the above-discussed atomizing nozzle arrangements 10 are configured to be used in the food industry and are operated in a manner consistent therewith. For example, according to certain embodiments of the present invention, a foodstuff and/or a food packaging material is coated utilizing the above-discussed atomizing nozzle arrangements 10 in an ultrasonic spraying process.

Figure 7:
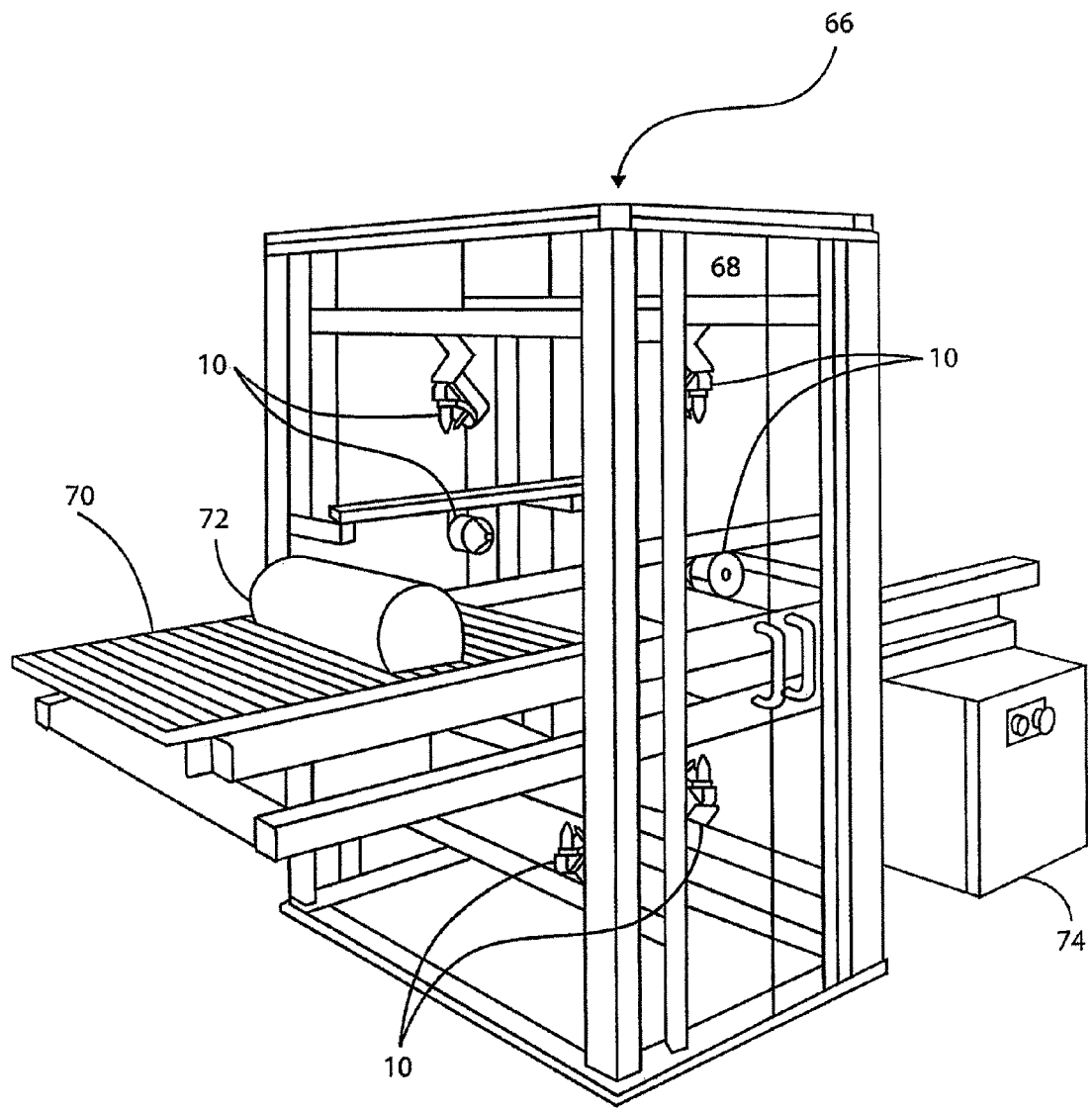
FIG. 7 is a perspective view of a food coater according to an embodiment of the present invention.

FIG. 7 illustrates a perspective view of a food coater 66 according to an embodiment of the present invention. The food coater 66 includes a plurality of nozzle arrangements 10 located within a chamber 68. Extending through the chamber 68 is a conveyor belt 70 upon which is positioned a foodstuff 72. Also, operably connected to and positioned external to the chamber 68 is a control system 74.

The control system 74 illustrated in FIG. 7, according to certain embodiments of the present invention, is computerized and connected to at least one of the nozzle arrangements 10 and the conveyor belt 70. The control system 74 may be configured to control one or more of the following: a triggering mechanism that turns the spraying system on and off (i.e., an on/off switch), nozzle power, liquid flow rate of the liquid entering the spraying mechanism (i.e., the nozzle arrangements 10 or the food coater 66 itself), air shaping, and the speed at which the top surface of the conveyor belt 70 moves relative to the nozzle arrangements 10. According to certain embodiments of the present invention, the nozzle arrangements 10 are controlled to operate at approximately one or more of the following frequencies: 25, 35, 48, 60 and 120 KHz. However, operation at other frequencies is also within the scope of the present invention.

Figure 5:
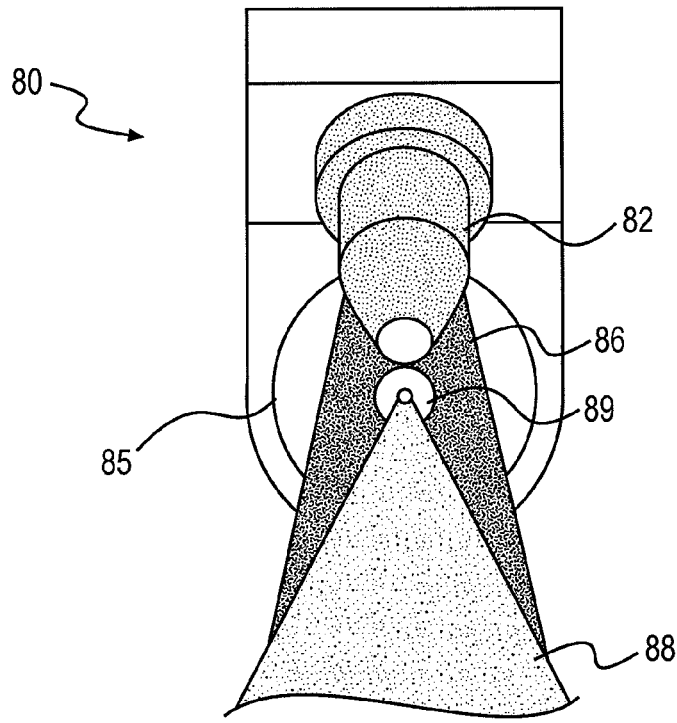
FIG. 5 is a front view of an ultrasonic nozzle spray arrangement according to a third embodiment of the present invention.

One advantage provided by the food coater 66 illustrated in FIG. 5 is the ability to spray a very thin, controlled and uniform layer of a chosen liquid onto either a foodstuff or a food packaging material. Because the coatings are thinner than those formed using currently available processes, less liquid is used than in currently available processes.

According to certain embodiments of the present invention, the chosen liquid includes one or more of the following: an anti-microbial solution, an anti-enzymatic browning solution, an edible oil, a liquid flavoring, a liquid spice, a nutriceutical, a protein solution, a peptide solution, a glaze, an anti-stick baking pan release solution, a sterilant, hydrogen peroxide, a food-grade acid, a food-grade alcohol, propionic acid, lactic acid, malic acid, adipic acid, and ethanol. Since at least some of these liquids are particularly costly, certain embodiments of the present invention allow for significant economic savings by the manufacturers of foodstuffs and/or food packaging materials. For example, the cost associated with the application of natural anti-microbacterial liquids to baked goods can be greatly reduced by reducing the amount of liquid needed, sometimes by as much as 67% or even 75%.

Also, coatings according to certain embodiments of the present invention are more uniform than those resulting from currently available processes. This is due to the fact that droplets formed by the spraying mechanisms including nozzles 10 according to certain embodiments of the present invention produce small and uniform droplets. As such, if a more uniform preservative coating is being sprayed on a foodstuff, utilizing coating methods according to certain embodiments of the present invention will increase the shelf-life of the foodstuff.

It should be noted that other industrial processes are also within the scope of certain embodiments of the present invention. For example, embodiments of the present invention may be used for coating applications in the electronics industry, the glass industry, the textile industry, etc.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A spraying system, comprising:
   a jet block assembly, including:
      an air inlet, and
      a liquid inlet configured to receive a liquid;
   an ultrasonic atomizing nozzle, attached to the jet block assembly, including:
      an atomizing section including a front horn having an atomizing surface to output an atomized liquid in an atomizing direction, the atomizing surface including at least one opening,
      a liquid conduit configured to convey the liquid from the jet block assembly to the opening of the atomizing surface, and
      an intermediate section, including one or more piezoelectric transducers, configured to promote ultrasonic-frequency mechanical motion in the atomizing section;
   a flat jet air deflector, attached to the jet block assembly, including:
      a single air outlet configured to output an air stream, and
      a curved deflection surface, positioned between the single air outlet and the atomizing surface of the ultrasonic atomizing nozzle, configured to deflect the air stream impinging thereon from the single air outlet toward the atomizing surface to entrain the atomized liquid in the air stream and produce a fan pattern composed of air and the atomized liquid, the fan pattern extending perpendicular to the atomizing direction;
   a support surface positioned above or below the ultrasonic atomizing nozzle and configured to support at least one of a foodstuff and a food packaging material, the atomizing surface of the ultrasonic atomizing nozzle being positioned between the flat jet air deflector and the support surface; and
   a control system, operably connected to the ultrasonic atomizing nozzle, including a computer.

2. The spraying system of claim 1, wherein the control system is operably connected to the support surface and is configured to control a speed at which the support surface moves relative to the nozzle.

3. The spraying system of claim 1, further comprising:
   an interface section, including a rear horn, configured to allow introduction of the liquid into the nozzle, wherein the intermediate section is positioned between the interface section and the atomizing section.

4. The spraying system of claim 3, wherein the interface section comprises a ceramic material and wherein the interface section and the atomizing section have different lengths.

5. The spraying system of claim 3, wherein the atomizing section is 3 times as long as the interface section.

6. The spraying system of claim 1, wherein the atomizing section is configured to form drops from the liquid deposited thereon at a rate above 600 ml/min.

7. The spraying system of claim 3, further comprising:
   a clamp positioned adjacent to an exterior surface of the interface section and an exterior surface of the atomizing section, wherein the clamp is configured to keep the interface section and the atomizing section adjacent to the intermediate section.

8. The spraying system of claim 6, wherein the interface section includes a first flange and the atomizing section includes a second flange, and further comprising:
   a first cover positioned adjacent to the first flange;
   a second cover positioned adjacent to the second flange; and
   a fastener connecting the first cover and the second cover.

9. The spraying system of claim 1, wherein the liquid includes at least one of an anti-microbial solution, an anti-enzymatic browning solution, an edible oil, a liquid flavoring, a liquid spice, a nutriceutical, a protein solution, a peptide solution, a glaze, an anti-stick baking pan release solution, a sterilant, hydrogen peroxide, a food-grade acid, a food-grade alcohol, propionic acid, lactic acid, malic acid, adipic acid, and ethanol.

10. The spraying system of claim 1, wherein the control system turns the nozzle on and off, adjusts nozzle power and controls a flow rate of the liquid entering the nozzle.

11. The spraying system of claim 1, wherein the support surface is movable, and a processor is configured to control a speed at which the support surface moves relative to the fan pattern.

* * * * *